Jan. 13, 1925.                         1,522,677
W. GREGORY
BUTTERIS
Filed June 13, 1924

Wallace Gregory,
Inventor

By Clarence A. O'Brien
Attorney

Patented Jan. 13, 1925.

1,522,677

UNITED STATES PATENT OFFICE.

WALLACE GREGORY, OF ALBERTVILLE, ALABAMA.

BUTTERIS.

Application filed June 13, 1924. Serial No. 719,838.

*To all whom it may concern:*

Be it known that I, WALLACE GREGORY, a citizen of the United States, residing at Albertville, in the county of Marshall and State of Alabama, have invented certain new and useful Improvements in a Butteris, of which the following is a specification.

This invention relates to new and useful improvements in farriers' tools and has for its principal object to provide a butteris for paring or trimming the hoofs of horses.

A further object of the invention is to provide a butteris of the above-mentioned character, wherein the same is of such a construction as to enable the cutter blade to be readily and easily removed for interchanging the same, or for resharpening the cutting edge thereof.

A still further object of the invention is to provide a farrier's tool of the above-mentioned character, which is simple in construction, inexpensive, strong and durable, and further well adapted for the purposes for which it is designed.

Other objects and advantages of this invention will become apparent during the course of the following description.

In the accompanying drawing, forming a part of this specification, and in which like numerals designate like parts throughout the same:

Figure 1:
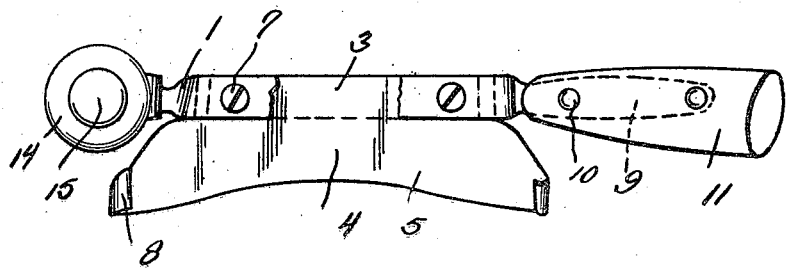
Figure 1 is a top plan view of my improved butteris.
Figure 2:
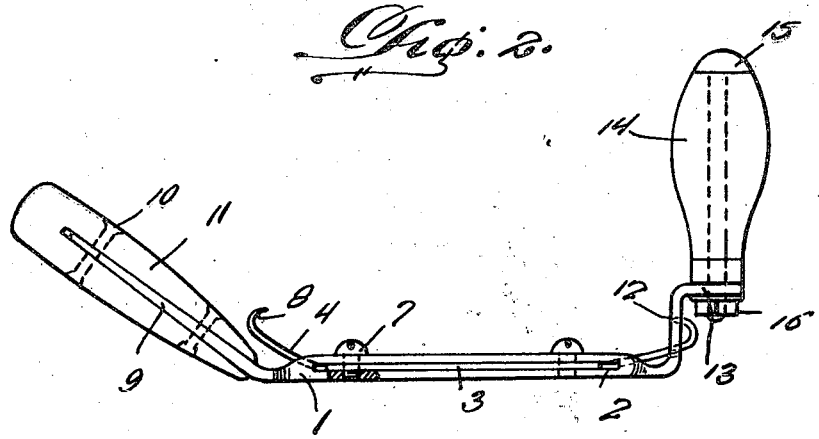
Fig. 2 is a side elevation thereof.
Figure 3:
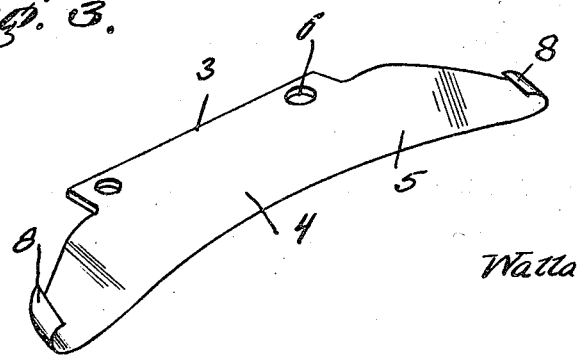
Fig. 3 is a detail perspective view of the cutter blade.

In the drawing, wherein for the purpose of illustration is shown the preferred embodiment of my invention, the numeral 1 designates an elongated bar, which is of suitable thickness and is provided with a longitudinally extending slot 2 therein, for the purpose of receiving the shank portion 3 of the cutter blade or knife 4, the same being provided with the curved cutting edge 5. For the purpose of securing the knife or cutter blade in the longitudinal slot of the bar 1, I provide the shank portion 3 of the knife with suitable openings, such as are illustrated at 6, and these openings are adapted to register with similar openings provided in the slotted portion of the bar, for receiving the fastening screws 7. The openings in the bar 1 on one side of the slot 2 are threaded for receiving the threaded ends of the screws 7, in the manner as clearly illustrated in Fig. 2 of the drawing.

This construction enables the knife to be readily detached from the bar for interchanging the same, or for resharpening the cutting edge thereof, and the simplicity in which the blade is supported in the slot 2 of the bar enables a farrier to easily and quickly interchange the cutting blades.

The outer free ends of the cutter blades 4 are turned upwardly as illustrated at 8, and the purpose thereof will be hereinafter more fully described.

One end of the bar 1 is provided with an upwardly inclined extension 9, and adapted to be secured thereto by any suitable fastening means, such as is shown at 10, is the handle 11. The opposite end of the bar 1 is provided with an upwardly extending portion 12, which terminates in a lateral extension 13 and the latter supports the handle 14, by means of the vertically extending bolt 15 and nut 16. It will thus be seen from the construction shown in the drawings, that the handles 11 and 14 respectively are disposed at an angle with respect to each other, to facilitate the proper manipulation of the tool in paring the hoofs of a horse. The turned up portions 8 provided on the free ends of the cutter blade or knife 4 will enable the tool to be used in trimming the hoof of a horse around the frog. The use of a cutter blade of the above-mentioned character furthermore obviates the necessity of having to employ the usual nippers in trimming or pulling the nails which have been driven into the hoof.

It will thus be seen from the foregoing description that a butteris has been provided, which is simple in construction, inexpensive, and the parts are so arranged as to enable the cutter blade to be readily removed and interchanged whenever it becomes necessary.

While I have shown the preferred embodiment of my invention, it is to be understood that various changes in the size, shape, and arrangement of parts may be resorted to without departing from the spirit of the invention and the scope of the appended claim.

Having thus described my invention, what I claim is:

A butteris comprising an elongated bar having a longitudinal slot provided therein, a cutter blade having the shank portion thereof detachably supported in said slot, an upwardly inclined extension provided on one end of said bar, a handle secured on said extension, an extension formed on the opposite end of said bar and being disposed upwardly in a vertical plane and then disposed laterally, and an additional handle supported on said lateral extension in a vertical plane.

In testimony whereof I affix my signature.

WALLACE GREGORY.